Figure 5:
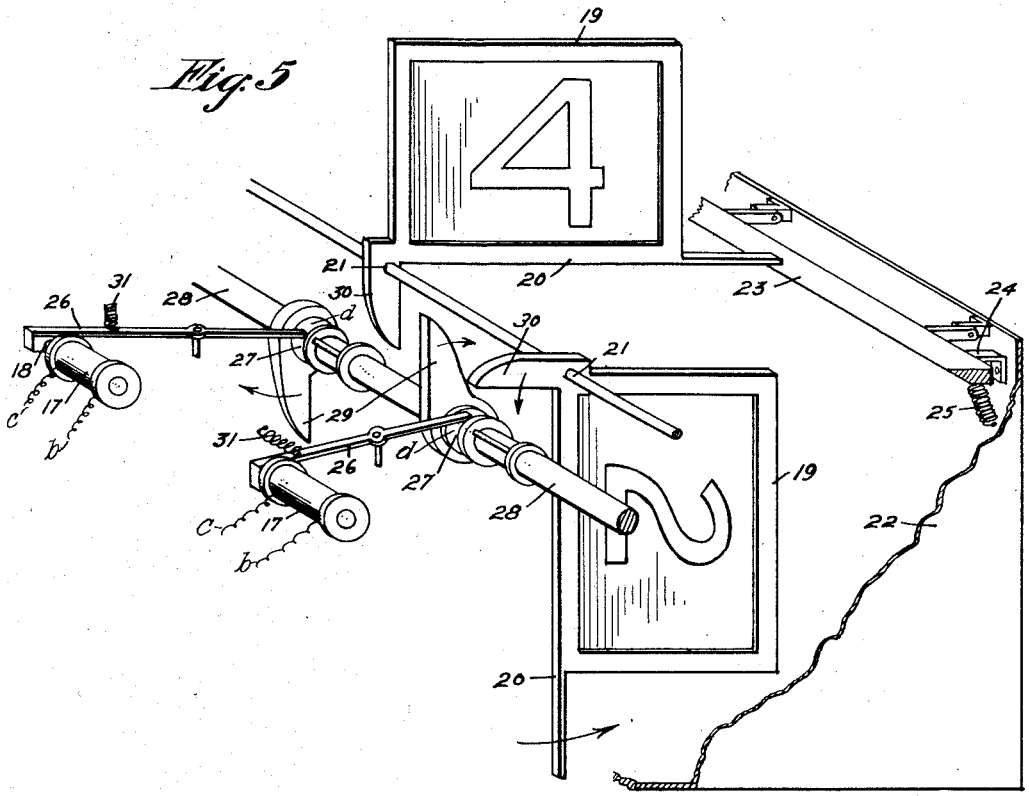

H. R. WALLACE.
SPEED INDICATOR.
APPLICATION FILED NOV. 15, 1911.
1,045,647.
Patented Nov. 26, 1912.
3 SHEETS—SHEET 1.
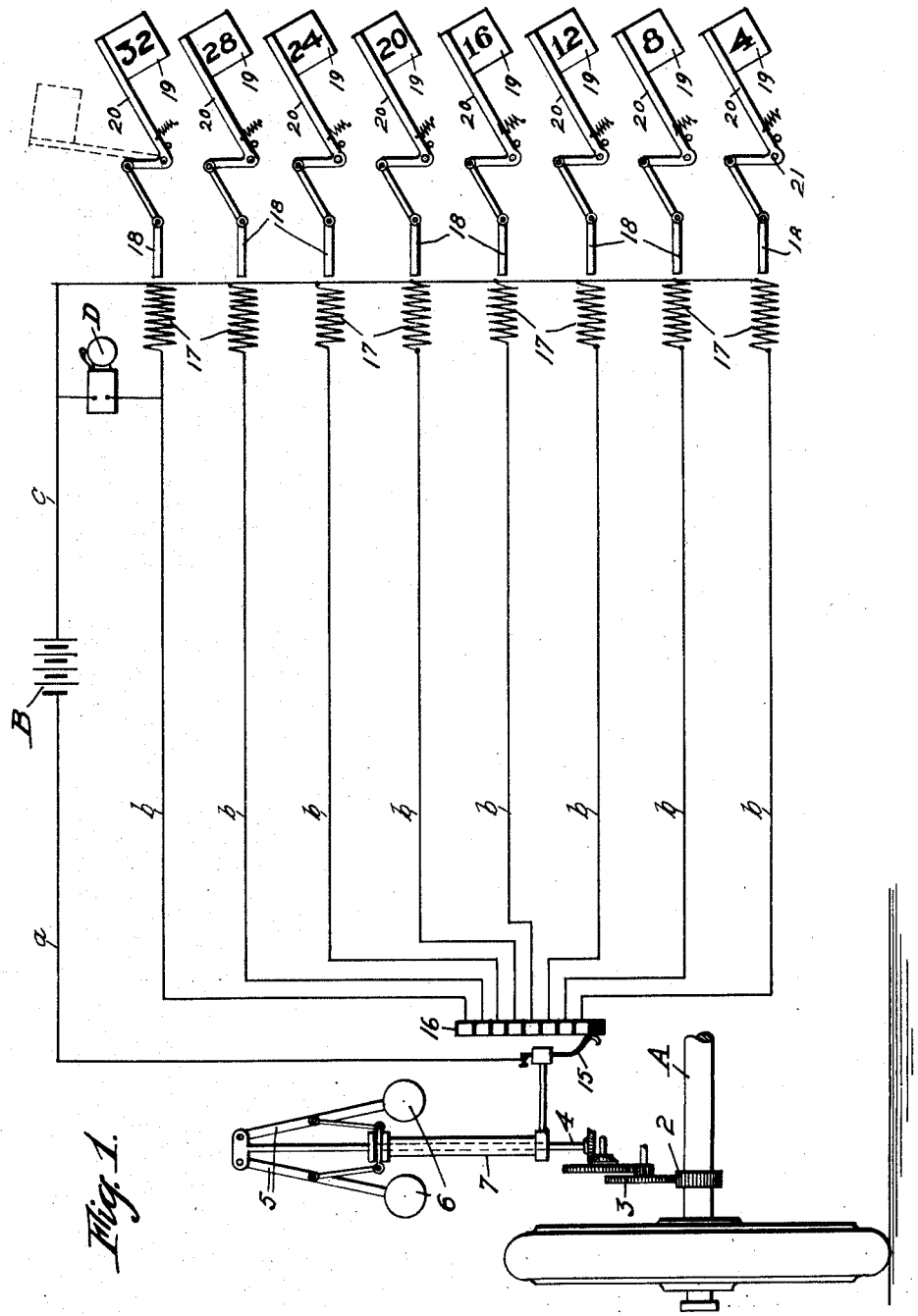

H. R. WALLACE.
SPEED INDICATOR.
APPLICATION FILED NOV. 15, 1911.
1,045,647.
Patented Nov. 26, 1912.
3 SHEETS—SHEET 2.
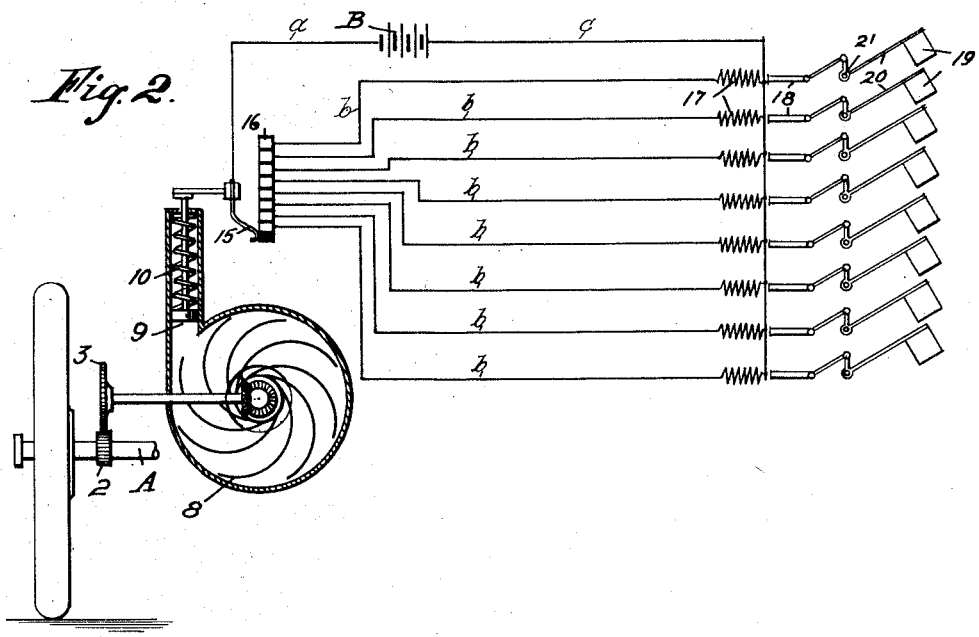
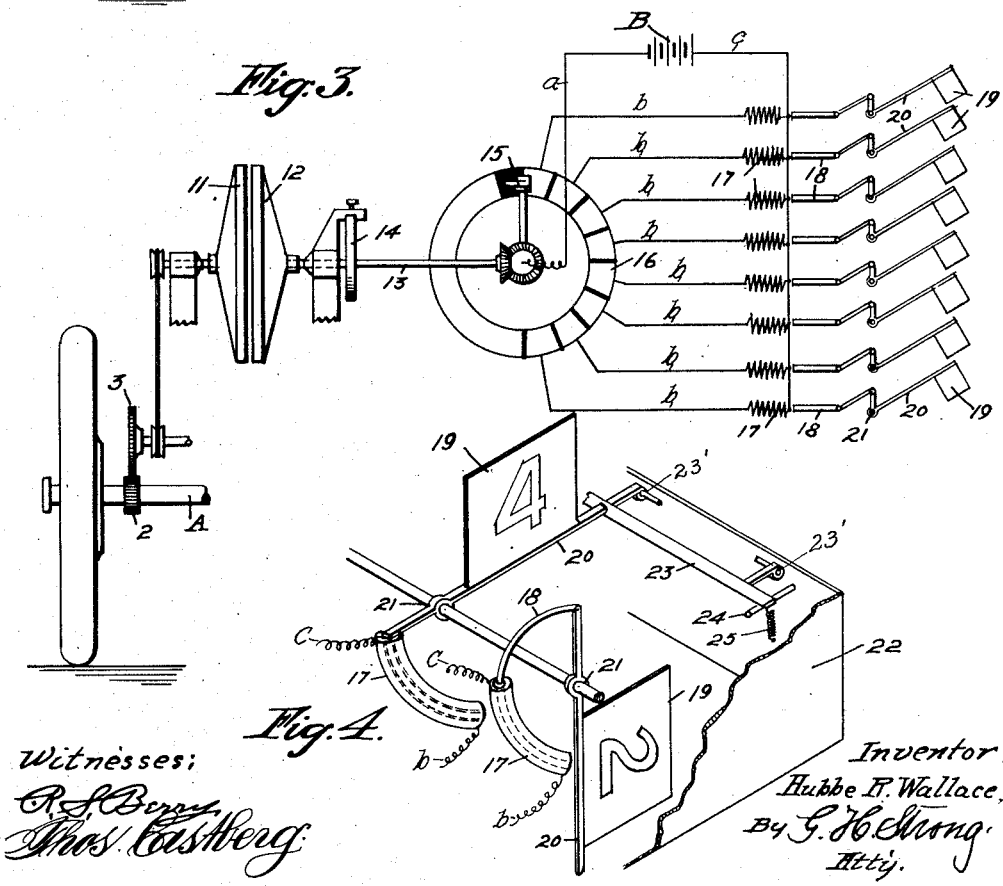

H. R. WALLACE.
SPEED INDICATOR.
APPLICATION FILED NOV. 15, 1911.

1,045,647.

Patented Nov. 26, 1912.
3 SHEETS—SHEET 3.

UNITED STATES PATENT OFFICE.

HUBBE R. WALLACE, OF EAST AUBURN, CALIFORNIA.

SPEED-INDICATOR.

1,045,647.  Specification of Letters Patent.  Patented Nov. 26, 1912.

Application filed November 15, 1911. Serial No. 660,323.

*To all whom it may concern:*

Be it known that I, HUBBE R. WALLACE, a citizen of the United States, residing at East Auburn, in the county of Placer and State of California, have invented new and useful Improvements in Speed-Indicators, of which the following is a specification.

This invention relates to a speed indicator and particularly pertains to an attachment for use on vehicles, whereby the rate of travel of the vehicle will be indicated to passersby.

It is the object of this invention to provide an apparatus which can be readily attached to vehicles, such as automobiles, street cars, or other conveyances, for the purpose of indicating the speed of the vehicle to people along the route of travel, as well as to the occupants thereof.

A further object is to provide an apparatus of the above character, which is simple in construction, and efficient in operation.

Other objects of this invention, together with the advantages to be derived by the use of the same, will be disclosed in the following specification.

The invention consists of the parts and the construction and combination of parts, as hereinafter more fully described and claimed, having reference to the accompanying drawings, in which—

Figure 1 is a diagrammatic view showing the principle of operation of the invention. Figs. 2 and 3 are similar views showing modified forms of the indicator operating mechanism. Fig. 4 is a detail perspective of the indicator. Fig. 5 shows a modified form of the indicator.

In the drawings A represents the rotating axle of an automobile or other vehicle, on which is mounted a pinion 2 which meshes with a gear 3 or other transmission mechanism, whereby a governor of any suitable description may be operated. Several forms of governing devices are here shown; Fig. 1 showing the ordinary centrifugal governor having a central spindle 4 geared with the pinion 3, with arms 5 carrying balls 6 pivotally attached thereto. The arms 5 are linked to a sleeve 7 on the spindle 4; the balls 6 moving outwardly as the speed of the spindle 4 increases, and inwardly as the speed diminishes, so as to raise and lower the sleeve 7 in the usual manner.

In Fig. 2 a fan 8 on a shaft rotated through the gear 3 acts to force air against a piston 9 to move the latter upwardly in opposition to a spring 10, as the speed of the gear 3 increases; the spring 10 moving the piston 9 downward as the speed diminishes.

The governor shown in Fig. 3 consists of a revoluble magnet 11, driven through the gear 3, which acts on a revoluble armature 12 on a shaft 13 in opposition to a spring 14; the movement of the armature 12 and the shaft 13 in one direction being controlled by the speed of rotation of the magnet 11; the spring 14 restoring the armature 12 toward the normal position as the speed of the magnet 11 diminishes. It is obvious that any form of governor may be employed and that it may be operated from any rotatable part of the vehicle, the speed of which varies with the speed of the vehicle; such, for instance, as the wheels thereof, in which event the governor driving pinion 2 would be mounted thereon instead of on the shaft A. The essential feature is to provide a governor operated by a moving vehicle for the purpose of moving a spring contact member 15, which is electrically connected with one terminal of a battery B by means of a conductor $a$, over a series of separated contact plates 16 from which conductors $b$ lead to a series of solenoid magnet coils 17 disposed at any convenient point on the vehicle body, and the terminals of which connect with a conductor $c$ leading to the other terminal of the battery B.

The solenoids 17 are adapted to act on solenoid cores 18 in the usual manner, when energized. The cores 18 are attached to suitable indicating devices or signals, which are designed to be operated by the energization of the solenoids in such manner as to indicate the speed of travel of the vehicle.

The indicating devices or signals are subject to many different forms of construction and arrangement, and may be of any character adapted to be operated by an electric impulse or other mechanical means controlled by a governor. The indicator shown in Fig. 4 consists of a series of blades or vanes 19 mounted on levers 20 pivoted in alinement at 21; the levers normally extending in an approximately vertical direction with the blades 19 concealed behind a shield 22 of any suitable description. The upper ends of the levers 20 are connected to the solenoid cores 18 in such manner that when the solenoids 17 are energized, the cores on entering the solenoids will rock the levers 20 so as to dispose them in such position as to expose the blades 19 above the shield 22.

Means are provided for retaining the levers 20 in their uppermost position independent of the solenoids 17, and are here shown as consisting of a latch bar 23 pivoted at 23' to swing upwardly, which is disposed transverse to the ends of the levers 20 in such manner that the ends of the levers will lift the bar 23 on their upward movement and pass therebeyond; the ends of the levers falling back and being supported on the bar 23. This bar is limited in its downward movement by a stop 24, and is normally retained in its lowermost position by means of a spring 25. In the operation of this form of the indicator, the energizing of one of the solenoids 17 acts to rock the lever 20 corresponding thereto, so as to cause it to be engaged at its outer end by the bar 23 and expose the plate 19 thereon; the operated lever 20 in lifting the bar 23, moving it from under such lever as may be previously supported thereon, and thereby allowing the latter lever to drop by gravity back to its normal position. By this arrangement but one blade 19 will be in the exposed position at one time.

The blades 19 are designed to carry numbers sufficiently large to be readable from a considerable distance; these numbers representing the speed of travel of the vehicle at the time a solenoid 17 is energized by the selective mechanism, consisting of the contact members 15—16; the contact member 15 being caused to move over the members 16 by the action of the governor in one direction as the speed of the vehicle increases and in the other direction as the speed diminishes.

The contact member 15 in passing from one contact member 16 to the next in the series in either direction, thus acts to energize the solenoids 17 successively, which in turn operate the levers 20 and blades 19 successively, as before described, to expose numbers corresponding to the speed of travel of the vehicle at different times; any variation in speed causing a corresponding variation in the number exposed.

In the form of the indicator shown in Fig. 5, the solenoid cores 18 are connected to levers 26, the outer ends of which extend into grooves $d$ formed on sleeves 27, which are slidable lengthwise on a shaft 28 and revoluble therewith, the shaft 28 being designed to be continuously rotated. The sleeves 27 carry cam faces or fingers 29 which are adapted to strike tappets 30 formed on the levers 20; the fingers 29 being normally disposed so as to pass to one side of the tappets 30 without operating the latter. Springs 31, acting on the levers 26 are here shown as a means for retaining the fingers 29 out of alinement with the tappet 30.

When a solenoid 17 is energized by the selective mechanism, before described, the lever 26 corresponding thereto is actuated so as to move the sleeves 27 longitudinally on the shaft 28 and thereby position the finger 29 thereon in alinement with a tappet 30 in such manner that the latter will be struck by the finger 29 and moved downwardly. This acts to rock the lever 20 and expose the plate 19 thereon, as before described.

The principle of operation of my invention is as follows: As the speed of the vehicle increases or diminishes, the governor acts to move the contact member 15 successively over the contact members 16 in either direction, so as to successively energize the solenoids 17 and thereby operate the indicating device, so as to expose a number to show to passersby the speed at which the vehicle is traveling; the numbers on the indicator being of such size as to be readable from a considerable distance.

Alarms may be mounted in the electrical circuit connecting the contact members 15—16, solenoids 17, and battery B, as shown at D in Fig. 1, the alarm consisting of an electric bell or other sound producing device which will operate when the contact member 15 closes a circuit with a contact member 16.

It will be understood that I am not to be limited to the exact construction and arrangement of parts herein shown and described, but that the invention includes changes and modifications thereof within the claims.

Having thus described my invention, what I claim and desire to secure by Letters Patent is—

1. A speed indicator including independently fulcrumed and numbered vanes or blades, solenoids, and intermediate connections between the solenoids and the vanes, electrical connection between the solenoids and independently disposed contact plates, a spring pressed arm movable over said contact plates, and intermediate mechanism connecting with a revoluble part to advance said arm and energize the solenoids so as to raise the numbered plates successively.

2. A speed indicator including fulcrumed arms and carrying numbered vanes, a shield by which said vanes are normally concealed, solenoids with connections whereby the energizing of the connected solenoid will raise a vane, contact plates, a spring arm movable over said plates by the increasing speed of the motor whereby the vanes are raised successively, and means for retaining the last exposed vane in its elevated position and simultaneously dropping the previously raised vane to a concealed position.

3. A speed indicating device including numbered vanes, a shield behind which said vanes are normally concealed, solenoids and connecting mechanism whereby the vanes may be successively raised as the speed increases, an electrical circuit, a series of contact plates and a spring pressed arm adapted to travel over said plates and included in the circuit, and mechanism whereby the arm is caused to advance by the increased speed of the connected motor and the solenoids are successively energized and the vanes are caused to swing up to a visible position, a support upon which the vanes are maintained in their exposed position, said support being movable to disengage the preceding vanes simultaneously with the exposure of a succeeding one.

In testimony whereof I have hereunto set my hand in the presence of two subscribing witnesses.

HUBBE R. WALLACE.

Witnesses:
CHARLES EDELMANN,
C. C. COOK.